Patented June 17, 1952

2,600,421

UNITED STATES PATENT OFFICE 2,600,421

COPOLYMERS OF ACRYLATES AND ALLYL ESTERS

Harry T. Neher, Bristol, and William L. Van Horne and La Verne N. Bauer, Philadelphia, Pa., assignors to Rohm & Haas Company, Philadelphia, Pa., a corporation of Delaware No Drawing. Application July 15, 1949, Serial No. 105,045

4 Claims. (Cl. 260—86.1)

This invention relates to copolymers from (A) esters of acrylic acid and a saturated aliphatic monohydric alcohol of sixteen to eighteen carbon atoms and (B) esters of a saturated aliphatic monocarboxylic acid of six to fourteen carbon atoms and an alcohol selected from allyl, methallyl, and 2-chloroallyl alcohols. It relates also to compositions of matter which are based on such copolymers dissolved in hydrocarbon liquids which have waxy pour points. These solutions are characterized by pour points which are lower than the pour points of the hydrocarbon fluids devoid of the copolymers.

It has long been known that oils may be thickened by the addition thereto of resinous material. In some instances, the compositions obtained by dissolving polymeric products in hydrocarbon fluids are improved in one or more properties. In some instances, the compositions containing a dissolved polymer have smaller changes in viscosity with changing temperature than the hydrocarbon fluid by itself. These compositions are described as having an improved viscosity index. In some cases, the solution of polymeric materials in an oil tends to raise the pour point of the oil. In other cases, the pour point remains unchanged. There are still other instances where the pour point is lowered. This last effect is scarcely predictable.

By way of specific illustration, polymers of cetyl acrylate, stearyl acrylate, octyl acrylate, or nonyl acrylate, allyl monoate, allyl octoate, methallyl laurate, allyl palmitate, methallyl nonoate, 2-chloroallyl isononoate, or the like do not lower the pour point of lubricating oils when they are dissolved therein. Mechanical mixtures of such polymers are likewise of no economic value in so far as their action in depressing pour points is concerned.

Hence, the discovery that the herein defined copolymers are effective pour point depressants in wax-containing hydrocarbon liquids was not to be predicted. It is now found that oil-soluble copolymers from (A) acrylic esters having alcohol residues having a saturated aliphatic hydrocarbon chain of sixteen to eighteen carbon atoms and (B) allylic esters with an acid residue having an acyclic saturated hydrocarbon chain of six to fourteen carbon atoms are effective pour point depressants when the ratio of groups of acrylic ester (A) to groups of allylic ester (B) is within a proportion of one mole of ester A per mole of ester B to one mole of ester A to a number of moles of ester B approximately equal to the number of carbon atoms in the longest straight chain of the carboxylic portion of the allyl ester.

The acrylic esters which are taken for preparing the copolymers of this invention have the formula

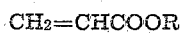

$$CH_2=CHCOOR$$

where R is an alkyl group having a chain of sixteen to eighteen carbon atoms. R may be a group, such as cetyl, heptadecyl, stearyl, or the equivalent. The cetyl and stearyl esters are those of first choice.

Methods for preparing acrylic esters are well known. Acrylic acid or acrylyl chloride, for example, may be reacted with a long-chained alcohol. While pure alcohols may be used, it is entirely satisfactory to utilize commercial products which are mixtures of such alcohols and which may even include lower alcohols.

The allyl esters are likewise obtained according to known procedures. Allyl alcohol and a carboxylic acid are reacted in the presence of an esterification catalyst with removal of water. Where available, acid anhydrides may be used in place of acids. Another method is based on use of acid halides. Interchange reactions are also useful in providing desired esters. They are of particular interest in forming methallyl esters.

The allyl and methallyl groups appear entirely interchangeable and the 2-chloroallyl group gives equivalent results. Larger α-substituents seem to change the behavior of the allyl grouping significantly, at least for the present purposes. Substituents in other positions similarly fail to lead to copolymers of the required type.

The acid groups which give allyl esters useful in providing copolymers of the required properties are from saturated aliphatic monocarboxylic acids of six to fourteen carbon atoms. They include n-hexoic, n-heptoic, n-octoic, 2-ethylhexoic, 3,5,5-trimethylhexoic, n-nonoic, isononoic, capric, undecanoic, lauric, and myristic. A chain length of at least six carbon atoms is needed even when the chain is branched. It is found that a branched chain, such as 2-ethylhexoic, gives about the same effect as n-hexoic.

The copolymers are prepared by mixing an acrylic ester of a long-chained alcohol and an allyl ester of a defined monocarboxylic acid within the prescribed ratios and copolymerizing these monomers under the influence of a peroxidic catalyst. Copolymerization is effectively carried out in the range of 75° C. to 160° C. The copolymerization is conducted in the presence of an inert organic solvent and in an inert atmosphere. An inert gas, such as nitrogen, may be used to sweep out air from the reaction vessel and to maintain the vessel reasonably free of oxygen. A volatile organic solvent may similarly be used. Suitable solvents include benzene, toluene, xylene, and solvent naphthas. Sufficient solvent is used to hold the copolymer in solution and to help prevent gelation.

As catalysts there may be used one or more of such organic peroxides as acetyl peroxide, caproyl peroxide, lauroyl peroxide, benzoyl peroxide, dibenzoyl diperoxide, di-tert.-butyl diperphthalate, tert.-butyl perbenzoate, 2,2-bis(tert.-butylperoxy)butane, methyl ethyl ketone peroxide, di-tert.-butyl peroxide, and tert.-butyl hydroperoxide. While about 2% of a peroxide in a mixture of monomers is sufficient to start copolymerization, it is desirable, if copolymerization is to be accomplished within a reasonable time, to use larger quantities. A particularly effective method is to add small amounts of peroxide from time to time as copolymerization proceeds. Total amounts of 3% to 15% of peroxide based on the combined weights of monomers are useful.

Typical procedures for preparing copolymers of this invention are shown in the following illustrative examples.

*Example 1*

A mixture was made of 50 parts by weight of stearyl acrylate, 50 parts of allyl hexoate, 25 parts of toluene, and 5 parts of benzoyl peroxide. This mixture was added over a period of 1.75 hours to a reaction vessel heated to 120° C. The reaction vessel was flushed with a small stream of nitrogen. The reaction mixture was mechanically stirred. The temperature was held at 120° C. for 4.25 hours and then lowered to 105° C. for the remainder of the heating period. Additions were made of benzoyl peroxide and toluene from time to time. Thus, after 2.75 hours, addition was made of 2 parts of the peroxide in 10 parts of toluene; after 4.25 hours, 5 parts of zenzoyl peroxide alone; after 5.25 hours, 2 parts of benzoyl peroxide; after 6.25 hours, 1 part of peroxide in 10 parts of toluene; and after 7.25 hours, 5 parts of toluene. Heating was discontinued after 7.33 hours. The product was a 51.8% solution of copolymer. A 30% solution of this copolymer in toluene had a viscosity of 4.8 cs. at 100° F.

*Example 2*

A mixture was prepared from 33.5 parts of stearyl acrylate, 66.5 parts of allyl 2-ethylhexoate, 25 parts of toluene, and 5 parts of benzoyl peroxide. This mixture was slowly added with stirring to a reaction vessel which was heated to 115°–121° C. and was swept out with nitrogen. At the end of 1.5 hours all of the mixture had been added to the vessel. Additions of benzoyl peroxide and solvent were made as follows:

After 2.5 hours, 2 parts of peroxide in 15 parts of toluene;
After 4.75 hours, 2 parts of peroxide;
After 6 hours, 2 parts of peroxide;
After 7 hours, 0.8 part of peroxide;

At 8 hours, 100 parts of toluene. At the fifth hour, the temperature was allowed to fall to 102° C. and at the sixth hour to 95° C. At the seventh hour, the temperature was raised to 102°–103° C. and held at this level until at the end of eight hours heating was discontinued.

The product was a 32.3% solution of copolymer, corresponding to a yield of 78.6%. A 30% solution in toluene had a viscosity of 3 centistokes at 100° C.

The copolymer was transferred to a light lubricating oil by mixing oil and toluene solution and then heating under reduced pressure. The final stripping was done at 140° C. at 1 mm. An oil solution containing 35.8% of copolymer was thus prepared. This concentrate is suitable for the facile addition of copolymer to lubricating oils.

*Example 3*

A mixture was prepared from 50 parts by weight of cetyl acrylate, 50 parts of methallyl laurate, 25 parts of toluene, and 5 parts of benzoyl peroxide. The mixture was added to a reaction vessel which was heated at 108°–110° C. The mixture was stirred and blanketed with nitrogen gas. Addition of catalyst and solvent was made from time to time, the schedule of addition being as follows:

After 2.67 hours, 2 parts of peroxide and 20 parts of toluene;
After 3.67 hours, 5 parts of peroxide and 25 parts of toluene;
After 4.67 hours, 2 parts of peroxide and 20 parts of toluene;
After 5.67 hours, 0.8 part of peroxide and 20 parts of solvent.

Heating was discontinued after eight hours of heating. Considerable solvent was carried away in the stream of nitrogen. The product obtained was a 67.5% solution of copolymer in a yield of 91.8%. A 30% solution of this copolymer in toluene had a viscosity of 28.3 cs. at 100° F.

*Example 4*

By the procedure of the previous examples a mixture of 50 parts by weight of tetracosyl acrylate, 50 parts of allyl isononate, 25 parts of toluene, and 5 parts of lauroyl peroxide was heated at 110° C. and 105° C. for eight hours with additions from time to time of peroxide and toluene. This copolymer when dissolved in a 150 Pennsylvania neutral raised the pour point 5° F.

*Example 5*

A mixture of 24 parts of cetyl acrylate, 76 parts of allyl myristate, 25 parts of toluene, and 5 parts of benzoyl peroxide was copolymerized by the procedure illustrated above at 115° and 105° C. with regular additions of peroxide and toluene. A total of 12 parts of peroxide was used and enough toluene to keep the copolymer solution fluid. The product was 73% solution of copolymer in a yield of 95.2%. The viscosity of a 30% toluene solution was 12 cs. at 100° F.

A copolymerization carried out in the same way with a mixture of 52.5 parts of cetyl acrylate, 47.5 parts of allyl myristate, 25 parts of toluene, and 5 parts of benzoyl peroxide with subsequent addition of peroxide and toluene yielded a copolymer which in a 30% toluene solution gave a viscosity of 87 cs. at 100° F. At 0.5% in a 150 Pennsylvania neutral it gave a pour point of 5° F.

*Example 6*

A mixture of 35 parts of cetyl acrylate, 65 parts of 2-chloroallyl laurate, 25 parts of toluene, and 5 parts of benzoyl peroxide was heated at 120° and 100° C. in accordance with procedures detailed above. Additional peroxide amounting to 10 parts was added together with sufficient toluene to maintain the copolymer in solution. The product was a 38% solution of copolymer.

A 30% solution of the copolymer in toluene had a viscosity of 12.6 cs. at 100° F.

*Example 7*

A mixture of 35 parts of cetyl acrylate, 65 parts of methallyl laurate, 25 parts of toluene, and 5 parts of benzoyl peroxide was copolymerized by the procedure used in Example 6. The product was a 40% solution of copolymer.

Copolymerization was performed with 44.2 parts of cetyl acrylate and 55.8 parts of 2-chloroallyl laurate (a 1:1.4 ratio of monomers) in a toluene solution as above. The product was a 35% copolymer solution in toluene which, when diluted to 30%, gave a viscosity of 10.6 cs. at 100° F.

The copolymers of this invention can be prepared in a wide range of molecular sizes. Variations from about 1,000 up to 50,000 are readily obtainable. The larger copolymers act not only as pour point depressants but also as improvers of viscosity index. For example, a cetyl acrylate-allyl myristate copolymer in a 1:2 ratio was copolymerized to impart a viscosity of 87.5 cs. at 100° F. to a 30% solution in toluene. At 0.5% in a 150 Pennsylvania neutral normally of 106.9 V. I., the viscosity index became 112.3 and at 2% the viscosity index became 126.9.

The effect of the copolymers of this invention on pour points was studied by using several concentrations in typical oils and observing the resulting pour points. In general the A. S. T. M. pour test (D97—47) was used and this was supplemented in some cases with maximum pour tests and shock chilling. The maximum pour test is described in Proc. A. S. T. M. 45, Appendix I, p. 245 (1945). The shock chilling determination is made by observing the samples during the initial cooling step with the cooling jacket at —60° F.

Oil I was a 150 Pennsylvania neutral having a pour point of +25° F. and a viscosity index of 106.7. This was known to be an oil which could be improved in pour point. Oil II was an S. A. E. 90 gear oil compounded from 30 parts of a 180 Pennsylvania neutral and 70 parts of a 150 Pennsylvania bright stock. This oil had a pour point of +25° F. Oil III was a 500 Mid-Continent solvent-extracted oil (S. A. E. 30) with a pour point of +25° F. This was known to be an oil which was not readily changed in pour point.

A copolymer prepared by methods described above from one mole of cetyl acrylate and one mole of allyl 3,5,5-trimethylhexoate gave a pour point of —10° F. when dissolved in Oil I at 0.5%. At 0.1% in this oil it gave a pour point of —15° F. In Oil III at 0.5% the pour point was 0° F.

A copolymer prepared from cetyl acrylate and allyl 3,5,5-trimethylhexoate in a molar ratio of 1:2, the copolymer giving a viscosity of 9.3 cs. at 100° F. in a 30% solution in toluene, was dissolved in Oil I. At 0.5% it depressed the pour point to —10° F., at 0.25% to —10° F. and at 0.1% to —5° F. In Oil II at 0.1% it depressed the pour point to 5° F. In Oil III at 0.5% the pour point by shock chilling was 0° F.

A copolymer prepared from cetyl acrylate and allyl myristate in a mole ratio of 1:3.5 gave the following pour points:

In Oil I at 0.5% and 0.25%, —10° F., at 0.1%, —5° F.; and

In Oil III at 0.5%, 5° F. under shock chilling.

Another copolymer from cetyl acrylate and allyl myristate in a mole ratio of 1:1 gave a pour point of 10° F. at 0.5% in Oil I.

A copolymer of cetyl acrylate and methallyl laurate in a 1:1.2 ratio gave pour points as follow:

In Oil I at 0.5% —20° F., at 0.25% —15° F., at 0.1% —10° F. and at 0.04% —5° F.;

In Oil II at 0.1% 5° F.; and

In Oil III at 0.5% —10° F. by shock chilling.

A copolymer of cetyl acrylate and 2-chloroallyl laurate in a 1:1.4 ratio gave pour points of —20° F. at 0.5% and at 0.25% —15° F. at 0.1%, and —10° F. at 0.04% in Oil I. At 0.1% in Oil II it gave a pour point of 10° F.

A copolymer of cetyl acrylate and 2-chloroallyl laurate in a 1:4 ratio gave a pour point of —10° F. in Oil I at 0.5% and 0.25%.

Copolymers of cetyl acrylate with allyl isobutyrate and butyrate respectively at 1:1, 1:1.5, and 1:2 mole ratios failed to give depressions of pour points of the test oils which were of economic significance.

A copolymer of octadecyl acrylate and allyl hexoate in a 1:2 mole ratio gave a pour point of 0° F. in Oil I at 0.5% and 0.25%.

A series of copolymers was prepared from octadecyl acrylate and allyl 2-ethylhexoate. At a mole ratio of 1:1 pour points of 10° F. were found at 0.5% in Oil III, and 0.1% in Oil II, and at 0.5% in Oil I. With a copolymer from these two esters in a mole ratio of 1:2.2 the pour point of Oil I was reduced to 0° F. at concentrations of copolymer from 0.1% to 0.5%. A copolymer from these same esters, but used in a ratio of 1:3.5 gave pour points at 0.5% and 0.25% in Oil I of —5° F. In Oil III at 0.5% the pour point was 0° F. under shock chilling. A copolymer based on the same esters in a mole ratio of 1:5.3 gave pour points at 0.5% in Oil I of —5° F. and at 0.25% in Oil I of 0° F., and in Oil III at 0.5% 10° F. by shock chilling. A copolymer from monomers in a 1:8 mole ratio gave a pour point of 20° F. at 0.5% in Oil I and of 30° F. at 0.25%.

A copolymer was prepared from one mole of octadecyl acrylate and 1.5 moles of allyl isononoate. A 30% solution of this in toluene had a viscosity of 5.3 cs. at 100° F. In Oil I at 0.5% and 0.25% it gave pour points of 0° F. There were prepared and compared under the same conditions separate polymers of octadecyl acrylate and of allyl isononoate. Neither polymer by itself depressed the pour point of Oil I. In fact the pour points determined at 0.5% of each was +30° F. The separate polymers were then mixed in a ratio of 1:1.5 and dissolved at a total of 0.5% in Oil I. The pour point of this solution was determined as 25° F.

A series of copolymers of octadecyl acrylate and allyl laurate was made. With mole ratios of 1:1, the pour points of the various test oils were 0° F. at 0.5% concentration. At a mole ratio of 1:1.5 an increased effect was observed, the pour point of 0° F. being reached with 0.25% of the copolymer. With mole ratios from 1:2 to 1:12, the effect of the copolymers was conclusive as to depression of pour point. A copolymer from the esters in a 1:3.5 ratio, for example, gave pour points at 0.5% in Oil I of —20° F. and in Oil III of 0° F. by maximum pour method and —20° F. by shock chilling. A copolymer at 1:12 ratio of monomers gave pour points at 0.5% in Oil I of —25° F. and of —20° F. in Oil III. It was noted that the limits for the ratios of the copolymerizing monomers is not so sharp for this particular combination as for other combinations.

The copolymers of this invention are novel.

They are soluble in hydrocarbon fluids and increase the viscosity thereof and improve the viscosity index as the molecular sizes of these copolymers are increased. The new copolymers are distinguished from polymers of individual components, from mixtures of such polymers, and from many other copolymers, including those based on the same components but outside the proportions here shown necessary in depressing the pour point of wax-containing hydrocarbon liquids. These copolymers have good thermal stability and are compatible with other oil additives, such as anti-oxidants, oiliness agents, detergents, extreme pressure agents, etc.

The hydrocarbons in which the above copolymers are most effective are petroleum liquids frim paraffinic or naphthenic stocks. The copolymers are effective in wax-containing lubricating oils and in other hydrocarbon liquids, such as fuel oils and diesel fuels. They improve these liquids in respects already noted without interfering with the normal functioning or use thereof. At concentrations of 0.01% to 5%, preferably 0.05% to 2%, the copolymers of this invention give desirable modifications of properties of wax-containing hydrocarbon liquids.

We claim:

1. An oil-soluble copolymer of (A) an ester of acrylic acid and a saturated aliphatic monohydric alcohol having a straight chained alkyl group of sixteen to eighteen carbon atoms and (B) an ester of an alkanoic acid having a carbon chain of six to fourteen carbon atoms and an alcohol selected from the class consisting of allyl, methallyl, and 2-chloroallyl alcohols, the mole ratio of groups from the first ester to groups from the latter ester being from one to one to one to a number equal to the number of carbon atoms in the longest straight chain of the latter ester.

2. An oil-soluble copolymer from cetyl acrylate and methallyl laurate, the mole ratio of groups from said acrylate to groups from said laurate being from 1:1 to 1:12.

3. An oil-soluble copolymer from octadecyl acrylate and allyl laurate, the mole ratio of groups from the acrylate to the groups from said laurate being from 1:1 to 1:12.

4. An oil-soluble copolymer from octadecyl acrylate and allyl 3,5,5-trimethylhexoate, the mole ratio of groups from the acrylate to the groups from the 3,5,5-trimethylhexoate being from 1:1 to 1:6.

HARRY T. NEHER.
WILLIAM L. VAN HORNE.
LA VERNE N. BAUER.

REFERENCES CITED

The following references are of record in the file of this patent:

UNITED STATES PATENTS

| Number | Name | Date |
|---|---|---|
| 2,125,885 | Bruson | Aug. 9, 1938 |
| 2,129,664 | Barrett | Sept. 13, 1938 |
| 2,234,829 | Neher | Mar. 11, 1941 |
| 2,407,954 | Fenske et al. | Sept. 17, 1946 |
| 2,419,221 | Kenyon | Apr. 22, 1947 |
| 2,440,318 | White | Apr. 27, 1948 |
| 2,441,023 | Larsen | May 4, 1948 |
| 2,524,563 | Evans et al. | Oct. 3, 1950 |

OTHER REFERENCES

"Allyl Alcohol" by Shell Devel., 1946, pages 27 to 31 pertinent.